(12) United States Patent
Li (10) Patent No.: US 12,503,058 B2
(45) Date of Patent: Dec. 23, 2025

(54) FOLDABLE BIKE CARRIER

(71) Applicant: Carman Enterprise Co., Ltd., Hangzhou (CN)

(72) Inventor: Xianwei Li, Hangzhou (CN)

(73) Assignee: Carman Enterprise Co., Ltd. (CN)

( * ) Notice: Subject to any disclaimer, the term of this patent is extended or adjusted under 35 U.S.C. 154(b) by 141 days.

(21) Appl. No.: 18/304,572

(22) Filed: Apr. 21, 2023

(65) Prior Publication Data

US 2023/0398948 A1 Dec. 14, 2023

(30) Foreign Application Priority Data

Jun. 10, 2022 (CN) .......................... 202210654288.9

(51) Int. Cl.
*B60R 9/10* (2006.01)
*B60R 9/045* (2006.01)

(52) U.S. Cl.
CPC ................ *B60R 9/10* (2013.01); *B60R 9/045* (2013.01)

(58) Field of Classification Search
CPC ........................................................ B60R 9/10
USPC ........................................................ 224/924
See application file for complete search history.

(56) References Cited

U.S. PATENT DOCUMENTS

| 2,019,636 | A |   | 11/1935 | Scrantom |       |
|-----------|---|---|---------|----------|-------|
| 4,823,997 | A |   | 4/1989  | Krieger  |       |
| 5,038,983 | A |   | 8/1991  | Tomososki|       |
| 5,586,702 | A |   | 12/1996 | Sadler   |       |
| 5,690,259 | A |   | 11/1997 | Montani  |       |
| 5,862,966 | A |   | 1/1999  | Mehls    |       |
| 5,947,357 | A | * | 9/1999  | Surkin   | B60R 9/10 |
|           |   |   |         |          | 224/535 |
| 6,047,869 | A |   | 4/2000  | Chiu     |       |
| 6,089,394 | A |   | 7/2000  | Ziglar   |       |
| 6,152,341 | A |   | 11/2000 | Lemay    |       |
| 6,168,058 | B1|   | 1/2001  | Janek    |       |
| 6,244,483 | B1|   | 6/2001  | McLemore |       |
| 6,491,195 | B1|   | 12/2002 | McLemore |       |
| 6,539,895 | B2|   | 4/2003  | Hoagland |       |

(Continued)

FOREIGN PATENT DOCUMENTS

CN  118871323 A    10/2024
DE  29916746 U1 *  1/2000  ............... B60R 9/06

(Continued)

OTHER PUBLICATIONS

International Search Report for European Application No. 22185249.4-1009 dated May 24, 2023, 7 pages.

(Continued)

*Primary Examiner* — Scott T McNurlen
(74) *Attorney, Agent, or Firm* — Thorpe North & Western, LLP (57) ABSTRACT

The present invention relates to a bike (12) carrier, in particular a roof bike carrier (1), for attachment to a vehicle with
a base body (4), which defines a longitudinal direction (L) and carries fixing means for fixing a first wheel, in particular the front wheel (11) of a bike (12), and
a sliding profile (24), which is moveably held at the base body (4) such that it can be moved relative to the base body (4) in the longitudinal direction (L) and which carries fastening means for fixing the second wheel, in particular the rear wheel (33) of a bike (12).

12 Claims, 11 Drawing Sheets

(56) References Cited

U.S. PATENT DOCUMENTS

| | | | |
|---|---|---|---|
| 6,866,009 B2 | 3/2005 | Smith, Jr | |
| 7,789,044 B2 | 9/2010 | McGrade | |
| 8,047,391 B2 | 11/2011 | Lu | |
| 8,763,870 B2 * | 7/2014 | Davis | B60R 9/048 224/323 |
| 9,096,182 B1 | 8/2015 | Roth | |
| 10,010,048 B2 | 7/2018 | Kellogg | |
| 10,059,276 B2 * | 8/2018 | Phillips | B60R 9/04 |
| 10,183,627 B1 | 1/2019 | Liu | |
| 10,576,903 B2 * | 3/2020 | Rodriguez | B60R 9/10 |
| 10,967,805 B2 | 4/2021 | Wang | |
| 11,046,379 B2 | 6/2021 | Tsai | |
| 11,148,607 B1 | 10/2021 | Hsieh | |
| 11,240,991 B2 | 2/2022 | Zhuo | |
| 12,187,236 B2 | 1/2025 | Huo | |
| 2003/0132259 A1 | 7/2003 | McLemore | |
| 2003/0222112 A1 | 12/2003 | McLemore | |
| 2008/0006664 A1 | 1/2008 | Bergerhoff | |
| 2008/0142559 A1 | 6/2008 | Lim et al. | |
| 2009/0058103 A1 | 3/2009 | Whitney | |
| 2009/0229093 A1 * | 9/2009 | Zwanenburg | B60R 9/06 24/517 |
| 2011/0108592 A1 | 5/2011 | Lee | |
| 2011/0132946 A1 * | 6/2011 | Sautter | B60R 9/045 224/324 |
| 2013/0062383 A1 | 3/2013 | Jeli | |
| 2014/0158729 A1 | 6/2014 | Pedrini | |
| 2015/0021371 A1 | 1/2015 | Ward | |
| 2015/0321620 A1 | 11/2015 | Lungershausen | |
| 2016/0068111 A1 | 3/2016 | Walker et al. | |
| 2017/0349111 A1 | 12/2017 | Ramsdell | |
| 2018/0072237 A1 | 3/2018 | Kuschmeader | |
| 2019/0381947 A1 * | 12/2019 | Fehr | B60R 9/10 |
| 2021/0170955 A1 | 6/2021 | Nusbaum | |
| 2022/0144181 A1 | 5/2022 | Garai Abrisketa | |
| 2022/0153205 A1 | 5/2022 | Kuschmeader | |
| 2022/0176886 A1 | 6/2022 | Sailer | |
| 2023/0398944 A1 | 12/2023 | Li | |
| 2023/0398946 A1 | 12/2023 | Li | |
| 2023/0398947 A1 | 12/2023 | Li | |
| 2023/0398948 A1 | 12/2023 | Li | |
| 2024/0253575 A1 | 8/2024 | Nilvius | |
| 2024/0351529 A1 | 10/2024 | Li | |
| 2024/0399972 A1 | 12/2024 | Willems | |

FOREIGN PATENT DOCUMENTS

| | | | |
|---|---|---|---|
| DE | 102 57 903 A1 | 6/2004 | |
| DE | 20 2010 016 281 U1 | 2/2011 | |
| DE | 10 2010 012 744 A1 | 9/2011 | |
| EP | 1502818 A1 | 2/2005 | |
| EP | 1 837 240 A1 | 9/2007 | |
| EP | 2 338 739 A1 | 6/2011 | |
| EP | 3 581 436 A1 | 12/2019 | |
| FR | 2 769 880 A1 | 4/1999 | |
| FR | 2905644 A1 | 3/2008 | |
| JP | 2010042805 A * | 2/2010 | B60R 9/048 |
| JP | 2017-081320 A | 5/2017 | |
| KR | 101 474 661 B1 | 12/2014 | |
| KR | 20240169346 A | 12/2024 | |
| SE | 535620 C2 | 10/2012 | |
| SE | 536070 C2 | 4/2013 | |
| WO | WO 2013/022671 A1 | 2/2013 | |
| WO | WO 2022/064290 A1 | 3/2022 | |

OTHER PUBLICATIONS

International Search Report dated Jan. 16, 2023, for application EP 22184361.8, 6 pages.

European Search Report dated Oct. 2, 2022, for application No. 22184972.2-1009, 7 pages.

International Search Report for European Application No. 2185257. 7-1009 dated May 24, 2023, 8 pages.

European Search Report dated Sep. 3, 2021, for Application No. 21176694.4, 6 pages.

* cited by examiner

FOLDABLE BIKE CARRIER

The present invention relates to a bike carrier, in particular a roof bike carrier.

Roof bike carriers are often used to transport bicycles on passenger cars. For this purpose, a support structure is fixed to the roof of a car, to which a corresponding bike carrier can be attached. Such a bike carrier comprises normally a profile rail extending in a longitudinal direction and carrying at least one, in particular two wheel holders by means of which the wheels of a bike can be fixed to the bike carrier. In order to adapt the bike carrier to different sizes of bikes, at least one wheel holder may be moved relative to the profile rail in the longitudinal direction.

Even if such bike carriers have proven itself in principal, it is sometimes considered as disadvantageous that such a bike carrier having a profile rail carrying two wheel holders cannot be transported in a space saving manner, when the bike carrier is not in use, as the profile rail is relatively long.

Accordingly, it is a task of the present invention to provide an alternative bike carrier, which can be transported easily when the bike carrier is not in use.

This object is solved by a bike carrier, in particular a roof bike carrier, with a base body, which defines a longitudinal direction and comprises fixing means for fixing a first wheel, in particular the front wheel of a bike, and a sliding profile, which is moveably held at the base body such that it can be moved relative to the base body in the longitudinal direction and which carries fastening means for fixing the second wheel, in particular the rear wheel of a bike.

The invention is based on the consideration to create a bike carrier having a sliding profile, which can be moved relative to the base body. Accordingly, when the bike carrier is in use, the sliding profile protrudes rearwardly from the base body and carries corresponding fastening means for fixing the second wheel of a bike. When the bike carrier should be transported, the sliding profile can be moved forward so that the overall length of the bike carrier is significantly reduced, when the bike carrier is not in use. Preferably, the base body and the fixing means for fixing a first wheel, in particular the front wheel of a bike, are formed as a unit, whereas the sliding profile can be moved relative to the base body.

In concrete terms, the base body can comprise a base profile, which is in engagement with a sliding profile such that the sliding profile is fixed to the base profile perpendicularly to the longitudinal direction, but can be moved relative to the base profile in the longitudinal direction. In other words, two profiles, namely the base profile and the sliding profile, are in engagement, in particular in a form-fit engagement with each other so that the sliding profile is held at the base profile and can be moved relative to the base profile in the longitudinal direction.

According to a preferred embodiment, the base profile has a substantially rectangular cross-section. Correspondingly, the sliding profile may have a U-shaped cross section, which is open towards the bottom and encompasses the base profile from the top. In order to guide the sliding profile on the base profile, the base profile can have on its upper side a guiding deepening extending in the longitudinal direction. Preferably, the guiding deepening has oblique side walls such that the guiding deepening broadens uploads.

Correspondingly, the sliding profile can comprise a corresponding guiding protrusion engaging into the guiding deepening and having a shape complementary to the shape of the guiding deepening. In this way, the sliding profile is positioned relative to the base profile by a form-fit engagement of the guiding protrusion into the guiding deepening.

Furthermore, the base profile may comprise a guiding groove having a rectangular shape, which is arranged centrally in the guiding deepening, and the sliding profile may have, in a central section of the guiding protrusion, two L-shaped projections extending downwards facing towards each other so that they form a T-shaped engagement groove in the sliding profile open towards the bottom. Such a T-shaped engagement groove may be used to lock the sliding profile relative to the base profile. Accordingly, a locking mechanism may be provided in order to lock the sliding profile relative to the base profile.

In concrete terms, the locking mechanism may comprise a slot nut, which is arranged in the engagement groove of the sliding profile. The slot nut may be connected to a threaded pin which extends through corresponding through-holes formed in the base body and extends towards the bottom so that the threaded pin projects downwardly from the base profile, and a clamping nut may be provided which can be screwed on the threaded pin so that the sliding profile can be braced to the base profile between the slot nut and the clamping nut. In this way, a force-fit fixation of the sliding profile relative to the base profile in the longitudinal direction can be achieved. It is also conceivable, that a clamping screw is used, which is directly screwed into a corresponding inner thread formed in the slot.

In order to increase the mechanical stability of the movement of the sliding profile relative to the base profile, the base profile may have on both lateral sides a T-shaped holding groove and the sliding profile may have, on its lateral U-legs, corresponding elongated holding projections each having a cross section in the shape of a L engaging behind the holding groove. In this way, a form-fit engagement of the sliding profile into the base profile can be achieved. In particular, it can be avoided, that the sliding profile unintentionally separates from the base profile. Furthermore, abutment means may be provided in order to limit the movability of the sliding profile relative to the base profile in the frontward and/or the rearward direction and/or to avoid a complete pull-off of the sliding profile from the base profile.

In order to fix a wheel of a bike, in particular the rear wheel of a bike, the fastening means may comprise a wheel holder, which is held on the sliding profile such that can be moved relative to the sliding profile in the longitudinal direction. In concrete terms, the wheel holder may comprise a wheel holder body, which is in a form-fit engagement with the sliding profile such that the wheel holder body can be moved relative to the sliding profile in the longitudinal direction, but is fixed to the sliding profile perpendicularly to the longitudinal direction. Preferably, the wheel holder body comprises an engagement contour at its bottom side, which may be in direct contact with a corresponding counter contour of the sliding profile. Concretely, the wheel holder body may have a shape in the form of a U, which is open towards the bottom and encompasses the sliding profile. The sliding profile may have on its upper side a concave outer contour and the wheel holder body may have a corresponding convex contour facing towards the bottom, so that the wheel holder body can lay on the sliding profile and is guided by the engagement of the convex contour into the concave upper contour of the sliding profile. Furthermore, on both lateral sides of the wheel holder body, corresponding engagement projections may be provided which engage inwards into corresponding engagement recesses of the sliding profile.

This design is based on the consideration to provide a wheel holder that can be moved freely in the longitudinal direction relative to the sliding profile. A fixation on the sliding profile is not necessary, as the position of the wheel holder relative to the sliding profile is determined by the length of the bike to be attached. The fixing means for fixing the first wheel to the base body may be arranged such that they determine a fixed position of the first wheel and, via the distance between the first and the second wheel of the bike, the position of the wheel holder on the sliding profile is determined. In this way, it is not necessary to lock the wheel holder on the sliding profile.

In a manner generally known per se, a tensioning device may be provided, by means of which the wheel of a bike can be fixed to the wheel holder. The tensioning device may comprise a tensioning belt, which is, at one end, fixed to the wheel holder body, can be laid around the wheel of a bike and, at its other end, can be releasably attached to the wheel holder body so that a wheel of a bike can be fixed to the wheel holder. Stop means may be provided in order to limit the movability of the wheel holder relative to the sliding frame in the frontward and/or the rearward direction.

In order to fix the other wheel, in particular the front wheel of a bike, to the base body, the fixing means may comprise two holding yokes, which are held at the base body in order to surround the first wheel of a bike, wherein a front holding yoke can surround the wheel of a bike from the front and a rear holding yoke can surround the wheel from the rear so that the first wheel of the bike can be fixed to the base body in a form-fit manner. This design is based on the consideration to practically clamp the first wheel of a bike from two sides between the two holding yokes. The holding yokes have preferably a U-shaped structure, wherein the two U-legs are held at the base body and the central section is designed to come in contact with the wheel of a bike. It may be provided that the lengths of the holding yokes may be varied to adapt the holding yokes to the size of the wheels of a bike to be attached. Preferably, the front holding yoke is designed such that the length may be varied.

For this purpose, the U-legs and the central section of the front holding yoke and/or the rear holding yoke may be formed as separate elements. The central section element may be held slidingly at the U-leg elements. In concrete terms, the central section element may comprise two through-openings, through which a U-leg element extends. Blocking means may be provided in order to block the central section element relative to the U-leg elements. At least one U-leg element, in particular both U-leg elements may carry a blocking toothing, into which corresponding engagement means formed at the central section element may be brought into engagement. It is also conceivable, that the front holding yoke and/or the rear holding yoke is designed such that its length cannot be varied.

In concrete terms, the front holding yoke can be held movably, in particular pivotably, at the base body, in particular at a front end section of the base body, between a use position, in which the front holding yoke is in a determined position relative to the base body and in which the wheel of a bike can be pushed against the front holding yoke, and a transport position, in which the front holding yoke extends substantially in the longitudinal direction, preferably lies on the sliding profile, in order to allow a space saving transport. Accordingly, in the use position, the front holding yoke may extend upward from the base profile. Preferably, the front holding yoke is arranged such that, in its use position, an angle of at least 40°, in particular of at least 50°, and/or at maximum 80°, in particular at maximum 70°, preferably an angle of 60° is provided with respect to the longitudinal direction.

According to a preferred embodiment, the rear holding yoke is moveably, in particular pivotably held at the base body, in particular at a front end section of the base body, so that the rear holding yoke can be moved against the wheel of a bike, when the bike is pushed against the front holding yoke, and arresting means are provided in order to lock the rear holding yoke, when it is in contact with the wheel of the bike. In other words, once the wheel of the bike is pushed against the front holding yoke, the rear holding yoke can be moved so that it is brought into contact with the first wheel of the bike in order to hold the wheel between the front holding yoke and the rear holding yoke.

The arresting means may comprise a sliding element held slidingly at the base body, in particular at the base profile, in the longitudinal direction, wherein the sliding element is coupled with the rear holding yoke such that a translational movement of the sliding element relative to the base body is converted into a pivoting movement of the rear holding yoke relative to the base body. The contour of the sliding element may be formed similar to the contour of the sliding profile so that the sliding element can be in engagement with the base profile.

In order to convert a translational movement of the sliding element relative to the base body into a pivoting movement of the rear holding yoke relative to the base body, the arresting means may comprise at least one, in particular two arresting levers, which are preferably arranged on opposite lateral sides of the base body, wherein each arresting lever is held pivotably at the sliding element and at the rear holding yoke, wherein the pivot axis of the arresting lever relative to the rear holding yoke is spaced apart from the pivot axis of the rear holding yoke relative to the base body. Accordingly, the sliding element held slidingly at the base body, the arresting levers and the rear holding yoke pivotably held at the base body form a slider-crank mechanism, which converts the displacement of the sliding element relative to the base body into a rotational movement of the rear holding yoke.

In order to lock the sliding element relative to the base body, the arresting means may comprise an arresting mechanism. In concrete terms, the arresting mechanism may comprise at least one toothing, in particular two toothings arranged on opposite lateral sides of the base profile and corresponding arresting elements, which are moveably, in particular pivotably held at the sliding element between an arresting position, in which they are in engagement with a toothing, in particular having a saw-tooth profile, of the base profile so that the sliding element is locked relative to the base profile, and a release position, in which they are out of engagement from the toothing so that the sliding element can be moved relative to the base body. Preferably, the arresting elements are biased, in particular by means of corresponding spring elements, towards their arresting position. In order to bring the arresting elements out of their arresting position into their release position by hand, they may comprise an actuation lever. The actuation lever and the arresting elements can be formed in a one-piece-design.

Furthermore, the base body may comprise attachment means, by means of which the bike carrier can be attached to a support structure, via which the bike carrier can be releasably attached to the roof of a car. The attachment means may be formed such that the base body can be screwed to a support structure, which preferably comprises two support beams extending transversely, in particular perpendicularly to the longitudinal direction. It is conceivable, that attachment grooves are provided on the bottom of the base body so that corresponding attachment slot nuts can be used in order to brace the base body against such support beams. However, other attachment mechanisms are also possible.

Further details of the invention become clear by the sub claims and the description of an embodiment with the reference to the drawing. In the drawing shows:

Figure 1:
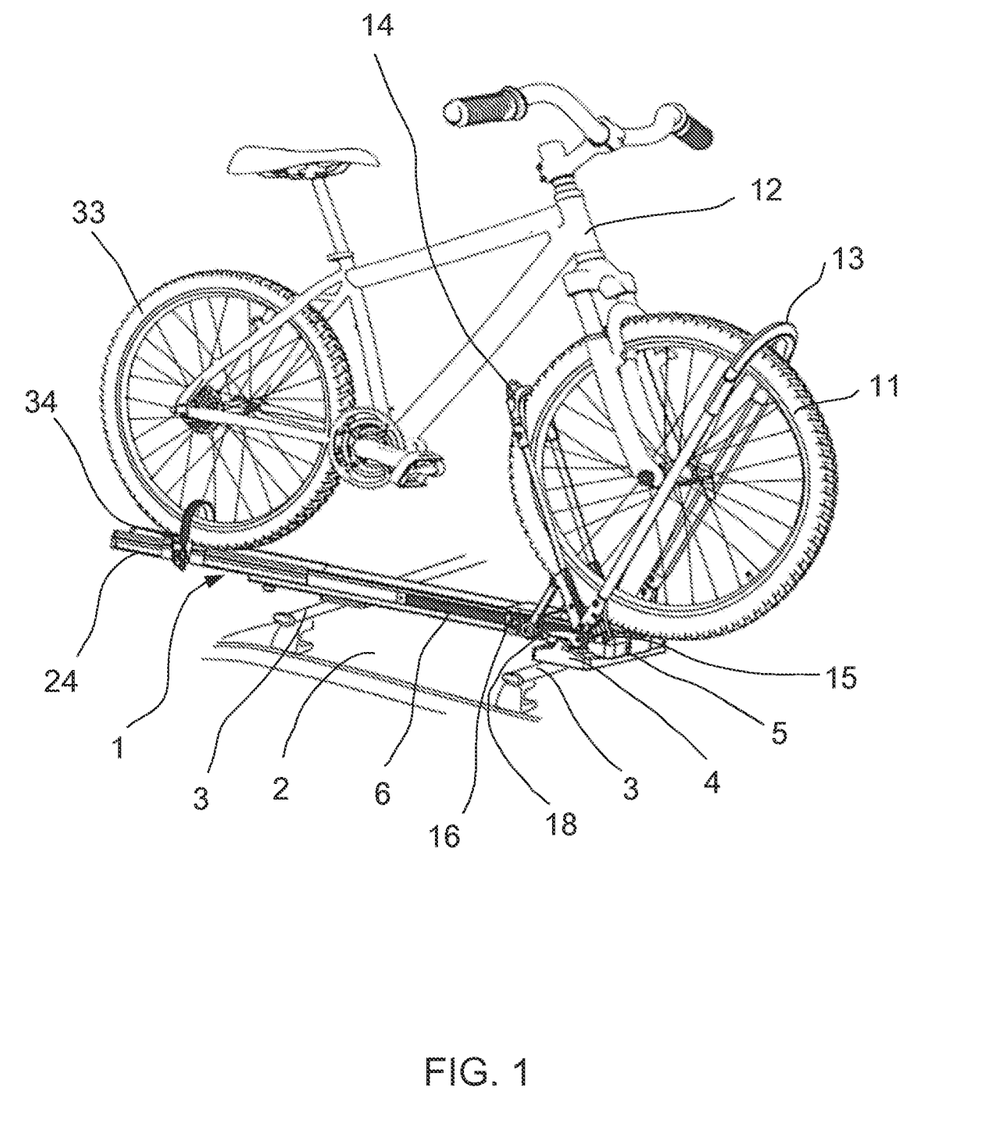
FIG. 1 a bike carrier according to the invention mounted to the roof of vehicle in a perspective view.
Figure 2:
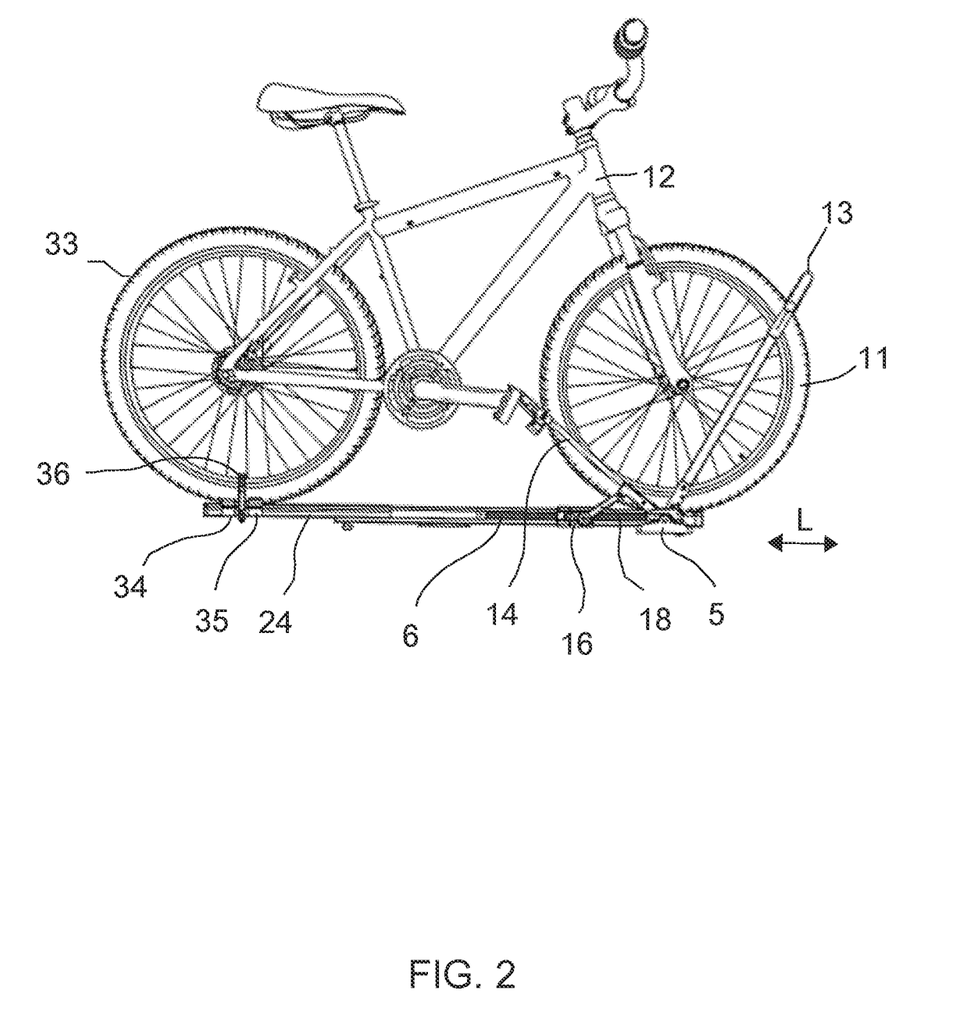
FIG. 2 the bike carrier of FIG. 1 with a rear holding yoke in a lower position in a side view.
Figure 3:
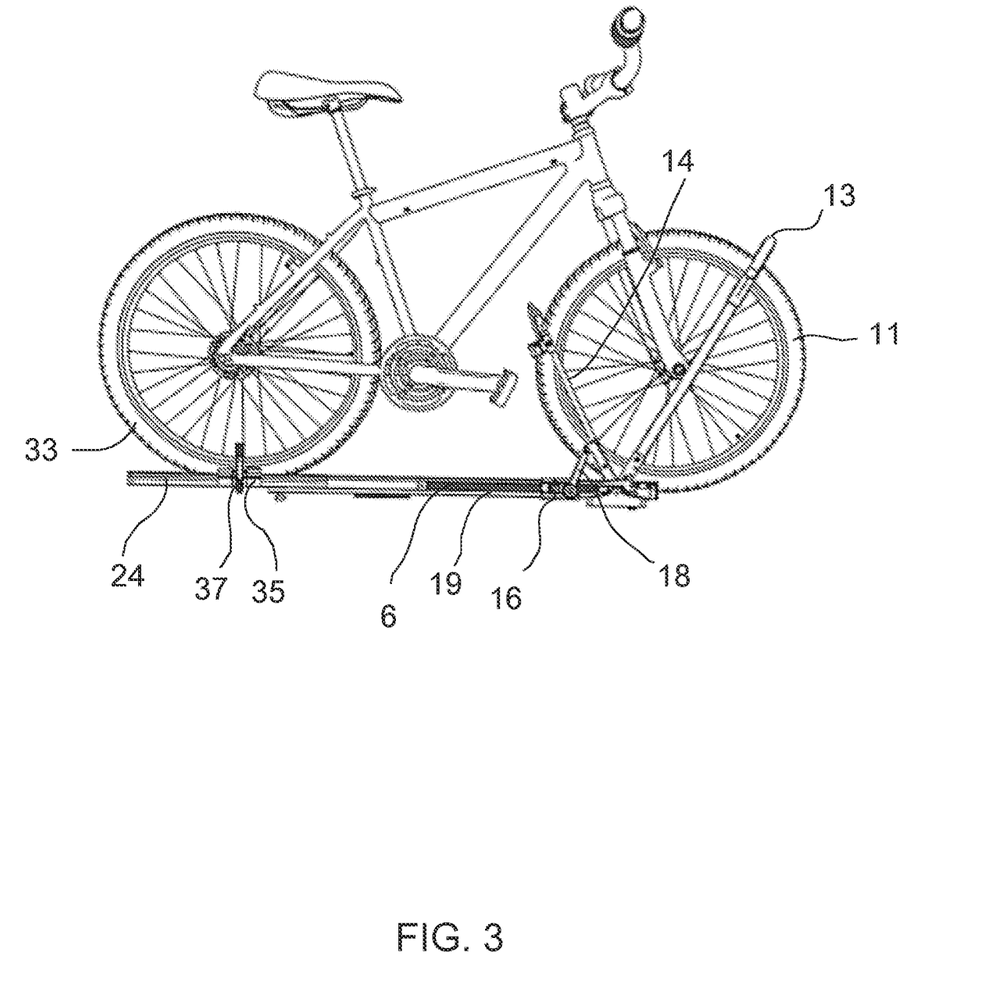
FIG. 3 the bike held of FIG. 1 with the rear holding yoke in a bracing position in a side view.
Figure 4:
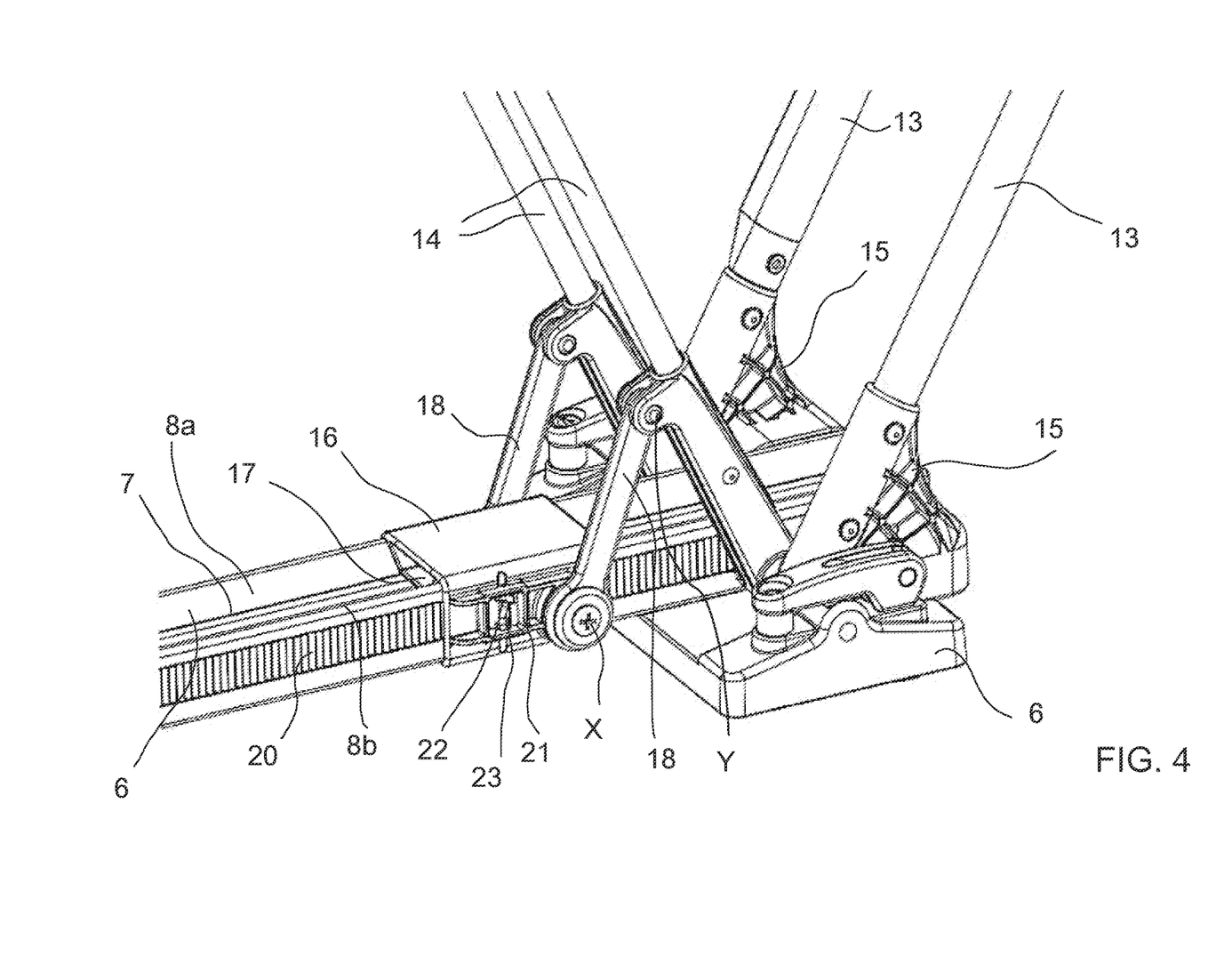
FIG. 4 the fixing means carried on the base body of the bike carrier of FIG. 1 in a partial perspective view.

FIGS. 1 to 3 show a roof bike carrier 1 according to the invention mounted to the roof 2 of a vehicle. In concrete terms, a support structure comprising two transverse beams 3 is provided on the roof 2 of the vehicle to which base body 4 of the roof bike carrier 1 is releasably attached. As it is shown in detail in FIG. 4, the base body 4 comprises at its front end a base plate 5, which is screwed to a front transverse beam 3 of the support structure. The base body 4 further comprises a base profile 6 made of an extruded aluminum profile, the front end of which is connected to the base plate 5 and which defines a longitudinal direction L.

Figure 5:
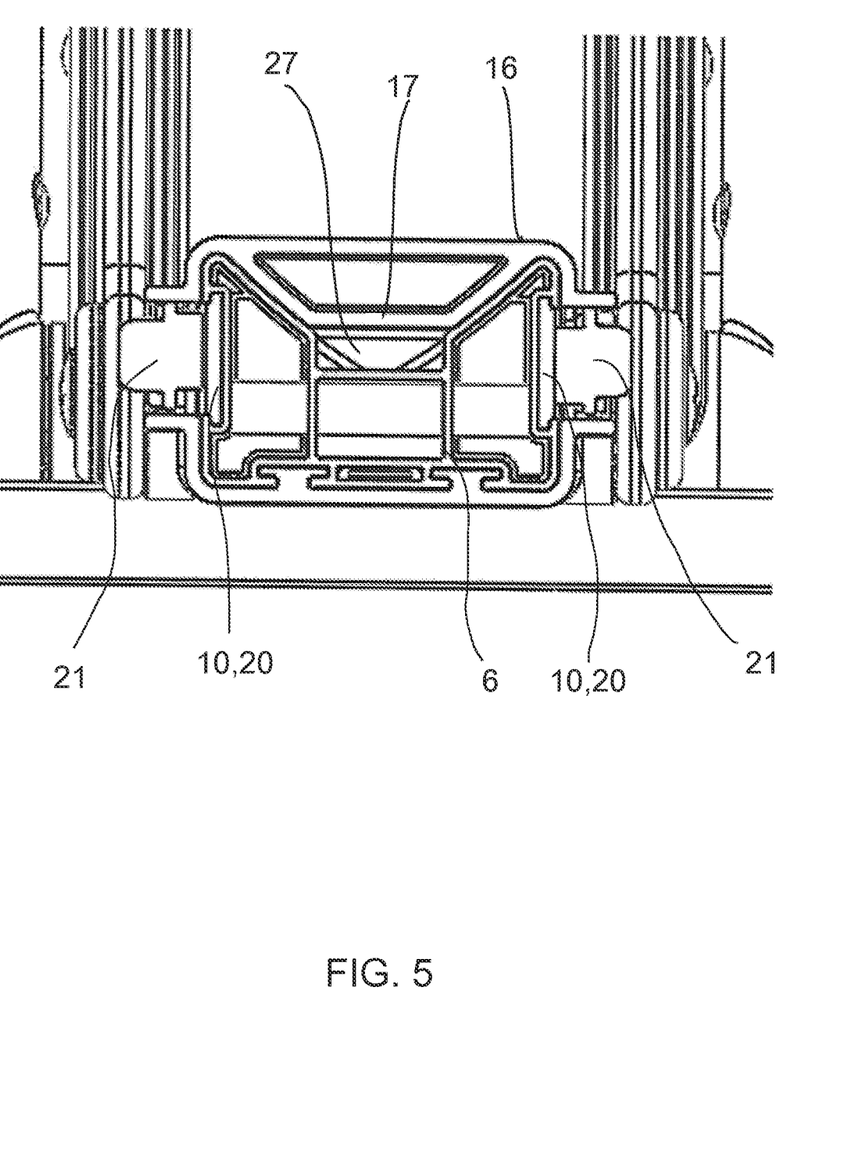
FIG. 5 the fixing means and a part of the base body of the bike carrier of FIG. 1 in a partial cross sectional view.

The cross section of the base profile 6 can be seen for example in FIG. 5. It has a substantially rectangular cross-section. On its upper side, a guiding deepening 7 extending in the longitudinal direction L is provided. The guiding deepening 7 has oblique side walls 8a, 8b which are both inclined at an angle of about 40° with respect to an horizontal line so that the guiding deepening 7 broadens upwardly. Centrally in the guiding deepening 7, a guiding groove 9 having a rectangular shape is arranged. Furthermore, on each lateral side of the base profile 6, a T-shaped holding groove 10 is arranged.

Figure 13:
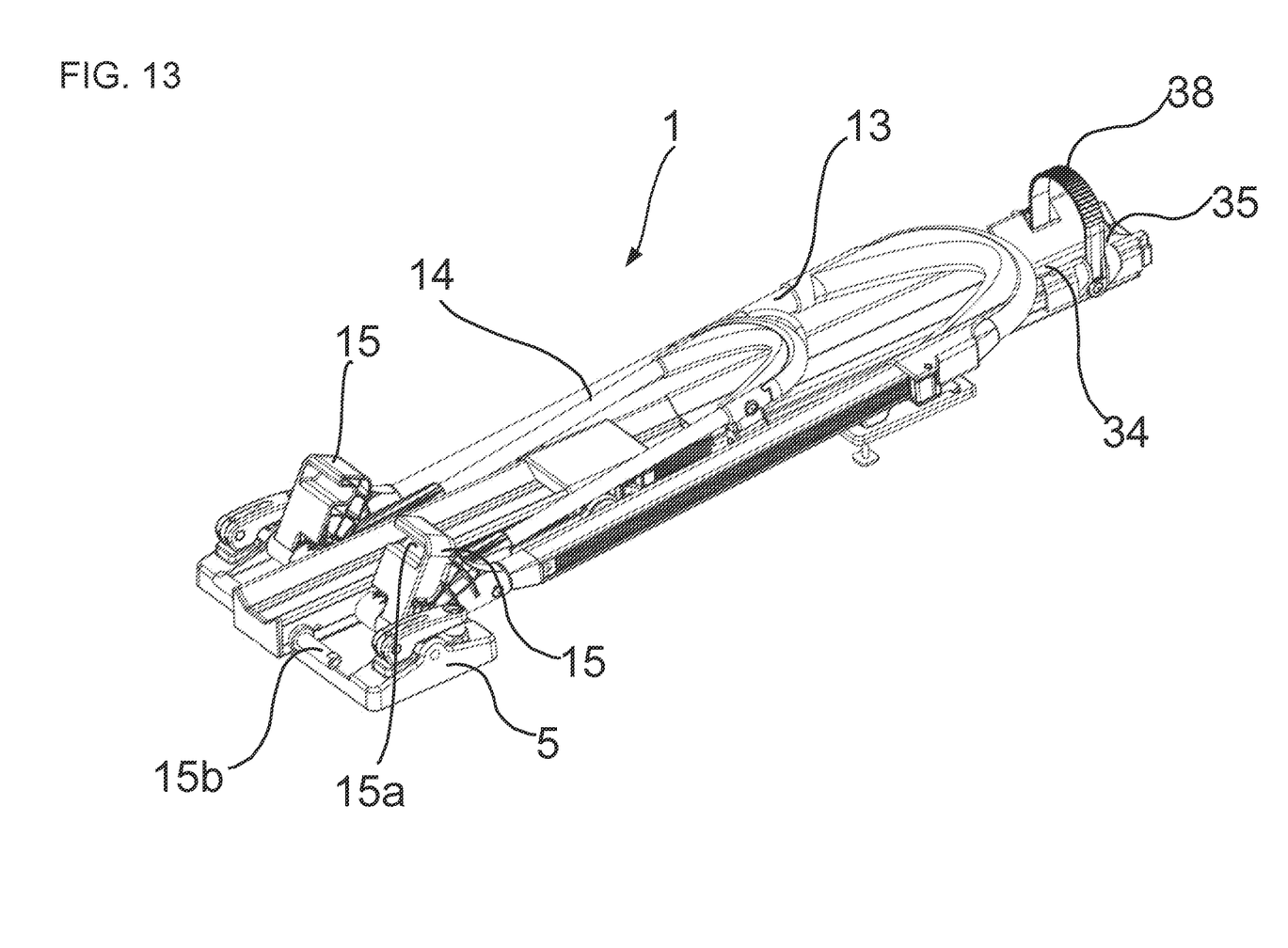
FIG. 13 the bike carrier of FIG. 1, wherein the front holding yoke is in its transport position.

The base body 4, in concrete terms the base plate 5, carries fixing means for fixing the front wheel 11 of a bike 12. The fixing means comprise two holding yokes 13, 14, which have the shape of a U, wherein the ends of both U-legs are held at the base plate 5. A front holding yoke 13 is provided in order to surround the front wheel 11 of a bike 12 from the front, as it is shown for example in FIGS. 1, 2 and 3. The front holding yoke 13 is pivotably held at the base body and can be moved between a use position shown in FIGS. 1 to 3 and a transport position shown in FIG. 13, in which the front holding yoke 13 extends substantially in the longitudinal direction L. For this purpose, both ends of the front holding yoke 13 are screwed to a holding element 15, which is pivotably held at the base plate 5. The front holding yoke 13 reaches its use position, when stopping recesses 15a formed in the holding element 15 come into contact with corresponding stopping bolts 15b protruding laterally from the base profile 6. In the use position, the front holding yoke 14 is inclined at an angle of about 60° with regard to the longitudinal direction L.

The length of the front holding yoke 13 can be adapted to different sizes of front wheels. For this purpose, in both U-legs of the front holding yoke 13, a corresponding toothing is provided into which engagement means formed at the central section of the front holding yoke 13 can engage. The central section of the front holding yoke 13 is held slidingly at the U-legs.

The rear holding yoke 14 is designed to surround the wheel 11 from the rear so that the front wheel 12 can be fixed to the base body 4 in a form fit manner between the front holding yoke 13 and the rear holding yoke 14. The rear holding yoke 14 is pivotably held at the base plate 5 so that the rear holding yoke 14 can be moved against the front wheel 11 of a bike 12, when the bike 12 is pushed against the front holding yoke 13. This pivoting movement of the rear holding yoke 14 is shown in FIGS. 2 and 3. In FIG. 2, the central section connecting the U-legs of the rear holding yoke 14 is not in contact with the front wheel 11 of the bike, wherein, in FIG. 3, the rear holding yoke 14 is pivoted upwards so that the rear holding yoke 14 is in contact with the front wheel 11 of the bike 12.

Arresting means are provided in order to lock the rear holding yoke 14 when it is in contact with the front wheel 11 of the bike 12, as it is shown in FIG. 3. For this purpose, the arresting means comprise a sliding element 16, which is held slidingly at the base profile 6 in the longitudinal direction L. As it is visible in FIGS. 4 and 5, the sliding element 16 is formed such that it surrounds the base profile 6 completely. In concrete terms, the inner contour of the sliding element 16 is formed at least partially complementary to the outer contour of the base profile 6. Accordingly, the sliding element 16 has a guiding projection 17, which is formed complementary to the guiding deepening 7 of the base profile 6.

The sliding element 16 is coupled with the rear holding yoke 14 such that a translational movement of the sliding element 16 relative to the base profile 6 is converted into a pivoting movement of the rear holding yoke 14 relative to the base body 4. For this purpose, the arresting means comprise two arresting levers 18, which are arranged on opposite lateral sides of the base profile 6. Each arresting lever 18 is held pivotably at the sliding element 16 about a corresponding first pivot axis X. In addition, each arresting lever 18 is held pivotably at the rear holding yoke 14 about a second pivot axis Y, which is spaced apart from the first pivot axis X. Accordingly, as it is visible in FIGS. 2 and 3, the rear holding yoke 14 can be pivoted upwards by moving the sliding element 16 frontwards relative to the base profile 6.

The arresting means further comprise an arresting mechanism, by means of which the sliding element 16 can be locked relative to the base profile 6. The arresting mechanism comprises two toothings 19 having a saw-tooth profile arranged on opposite lateral sides of the base profile 6. In concrete terms, the toothings 19 are formed by two toothed racks 20 which are arranged in the holding grooves 10 in a front section of the base profile 6.

Figure 6:
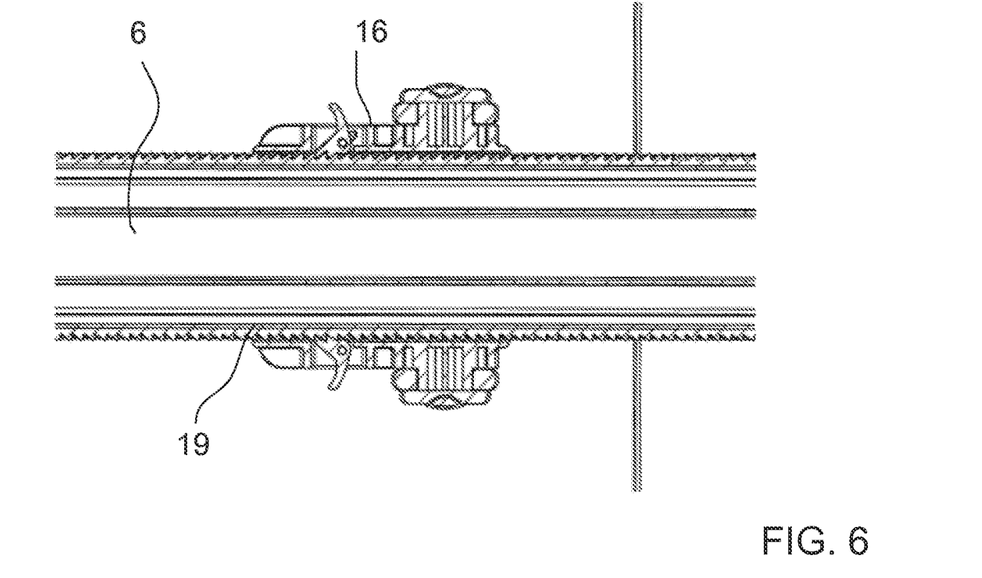
FIG. 6 the sliding element and the base body of the bike carrier of FIG. 1 in a longitudinal cross-sectional view, wherein the arresting elements are in their arresting position.
Figure 7:
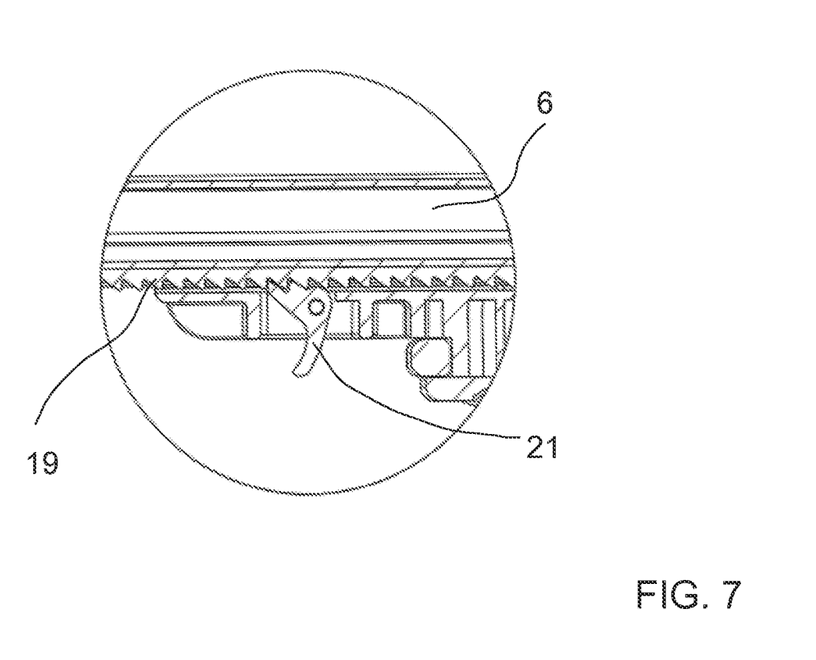
FIG. 7 the arrangement shown in FIG. 6 in enlarged cross-sectional view.
Figure 8:
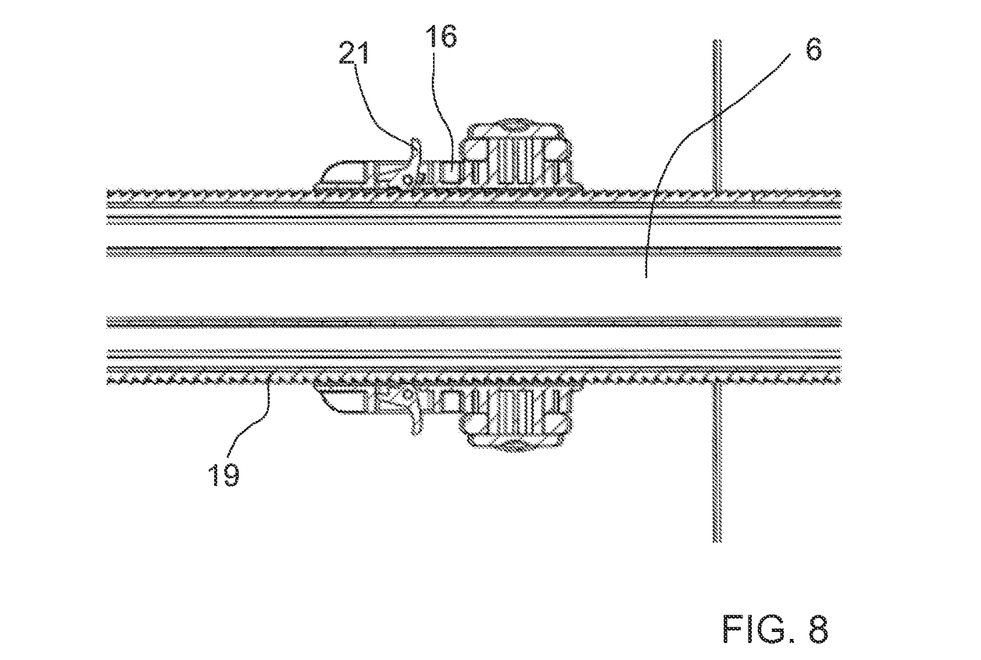
FIG. 8 the arrangement shown in FIG. 6, wherein the arresting elements are in their release position in cross-sectional view.
Figure 9:
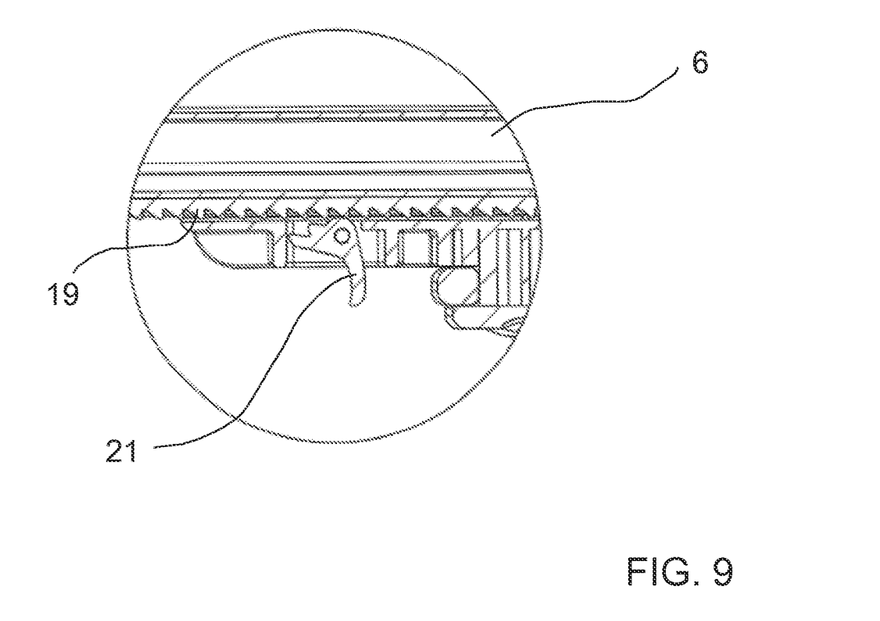
FIG. 9 the arrangement shown in FIG. 8 in a partial cross-sectional view.
Figure 10:
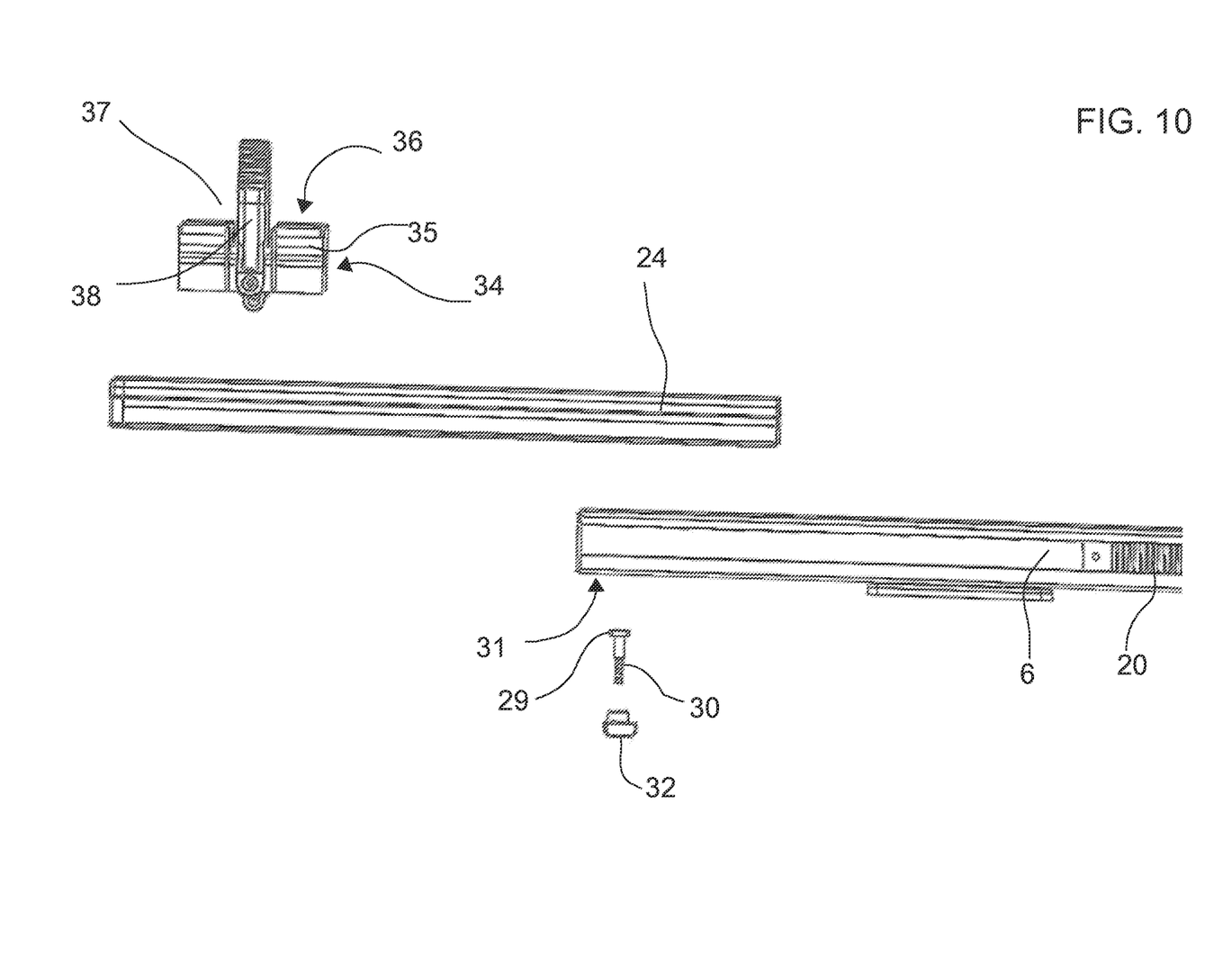
FIG. 10 the rear end section of the bike carrier of FIG. 1 in an exploded side view.
Figure 11:
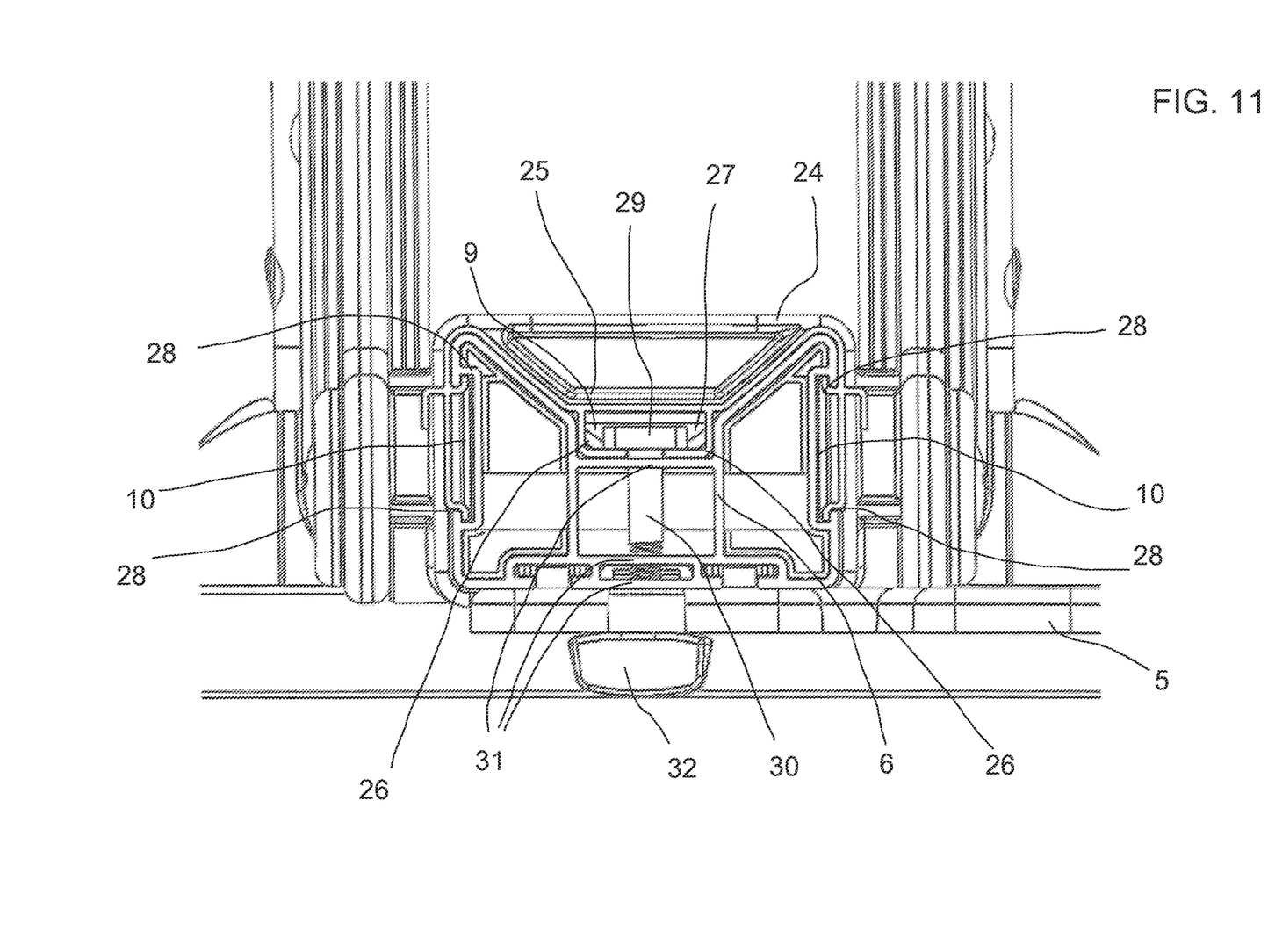
FIG. 11 the rear end section of the bike carrier of FIG. 1 in a cross sectional view.

The arresting mechanism further comprises two arresting elements 21, which are pivotably held at the sliding element 16 about a vertically extending pivot axis. The arresting elements 21 are beared pivotably in corresponding bearing holes 22 formed in the sliding element 16 between an arresting position in which they are in engagement with the toothing 19 of the base profile 6 and which is shown in FIGS. 6 and 7, and a release position, in which they are out of engagement from the toothing 19 shown in FIGS. 8 and 9. In the arresting position, the sliding element 16 is locked relative to the base profile 6 at least in the rearward direction so that unintended movement of the rear holding yoke 14 is excluded. In the release position, the sliding element 16 can be moved relative to the base profile 6. The arresting elements 21 are biased towards their arresting position and comprise an actuating lever 23.

The bike carrier 1 further comprises a sliding profile 24, which is in engagement with the base profile 6 such that the sliding profile 24 is fixed to the base profile 6 perpendicularly to the longitudinal direction L, but can be moved relative to the base profile 6 in the longitudinal direction L. It can be moved relative to the base profile 6 such that it extends beyond the rear end of the base profile 6, when it is in use (FIGS. 1 to 3). When the bike carrier 1 is not in use and should be transported, the sliding profile 24 can be moved forward relative to the base profile 6 until the sliding profile 24 comes into contact with the tooth racks 20 arranged in the holding grove 10 of the base profile 6.

The sliding profile 24 has a U-shaped cross-section, which is open towards the bottom and encompasses the base profile 6 from the top. It further comprises a corresponding guiding protrusion 25, which engages into the guiding deepening 7 of the base profile 6 and has a shape complementary of the shape of the guiding deepening 7. In other words, the shape of the guiding protrusion 25 is formed such that it comes into flat contact with the side walls 8a, 8b of the guiding deepening 7.

In a central section of the guiding protrusion 25, the sliding profile 24 has two L-shaped projections 26 extending downwards and facing towards each other so that they form a T-shaped engagement groove 27 in the sliding profile 14 open towards to bottom.

Furthermore, the sliding profile 24 has on each of its both lateral U-legs elongated two holding projections 28, each having a cross section in the shape of an L and facing away from each other such that they engage behind the corresponding holding groove 10 formed in the base profile 6.

Figure 12:
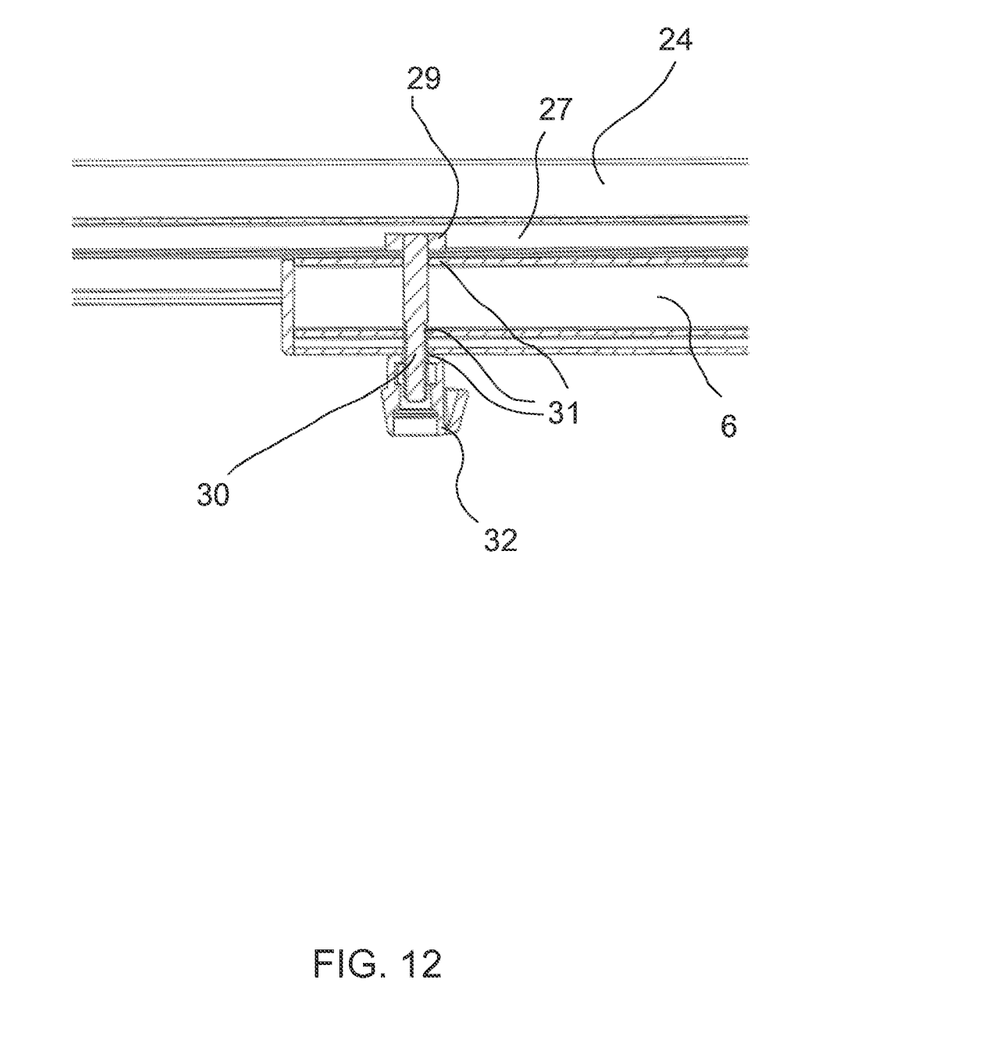
FIG. 12 the rear end section of the base body of the bike carrier of FIG. 1 and the sliding profile in a longitudinal cross-sectional view.

In order to lock the sliding profile 24 relative to the base profile 6, a locking mechanism is provided. The locking mechanism is shown in detail in FIG. 12. It comprises a slot nut 29, which is arranged in the engagement groove 27 of the sliding profile 24. The slot nut 29 is connected to a threaded pin 30, which extends through corresponding through-holes 31 formed in the base profile 6. The threaded pin 30 projects downwardly to the base profile 6. A clamping nut 32 is provided which can be screwed on the threaded pin 30 in order to brace the sliding profile 24 to the base profile 6 between the slot nut 29 and the clamping nut 32. For this purpose, the clamping nut 32 has an outer shape such that it can easily be rotated by hand.

The sliding profile 24 carries in a rear end section fastening means for fixing the rear wheel 33 of the bike 12. The fastening means comprise a wheel holder 34, which is held on the sliding profile 24 such that it can be moved relative to the sliding profile 24 in the longitudinal direction L. In concrete terms, the wheel holder 34 comprises a wheel holder body 35 having a wheel receiving deepening 36. The wheel holder body 35 is in form-fit engagement with the sliding profile 24 such that the wheel holder body 35 can be moved relative to the sliding profile 24 in the longitudinal direction L, but is fixed to the sliding profile 24 perpendicularly to the longitudinal direction L.

The wheel holder 34 further comprises a tensioning device 37, by means of which the rear wheel 33 of the bike 12 can be fixed to the wheel holder body 35. The tensioning device 37 comprises a tensioning belt 38, which is, at one end, fixed to the wheel holder body 35, can be laid around the rear wheel 33 and, at its other end, can be releasably attached to the wheel holder body 35, so that the rear wheel 33 can be fixed to the wheel holder body 35.

When a bike should be attached to the roof bike carrier 1 described above, at first, the front wheel 11 of the bike can be moved until it comes into contact with the fixed front holding yoke 13.

After that, the rear holding yoke 14 can be moved upwards by moving the sliding element 16 frontwards. A translational movement of the sliding element 16 in the longitudinal direction is converted into a pivoting movement of the rear holding yoke 14 by means of the arresting levers 18. Due to the saw tooth profile of the toothing 19, the sliding element 16 can be moved forward without bringing the arresting elements 21 into their release position. On the other hand, a movement of the sliding element 16 rearwards is not possible due to the engagement of the arresting elements 21 into the corresponding toothings 19.

In this way, the position of the bike relative to the bike carrier 1 is determined. The sliding profile 24 can be moved relative to the base profile 6 such that the rear wheel 33 can be positioned above the sliding profile 24. By means of the locking mechanism, the sliding profile 24 can be locked relative to the base profile 6. The wheel holder 34 can be positioned below the rear wheel 33 of the bike as the wheel holder 34 can be moved freely relative to the sliding profile 24. By laying the tensioning belt 38 around the rear wheel 33, the rear wheel 33 can be fixed to the wheel holder 34.

In this way, the bike carrier 1 can be adapted easily to different sizes of bicycles. Furthermore, the bike carrier 1 is easy to transport as the sliding profile 24 can be moved forwards when the bike carrier 1 should be transported so that the overall lengths of the bike carrier 1 is reduced when the bike carrier 1 is not in use.

REFERENCE CHARACTER LIST 1 roof bike carrier
2 roof
3 transverse beam
4 base body
5 base plate
6 base profile
7 guiding deepening
8a, 8b side wall
9 guiding groove
10 holding groove
11 front wheel
12 bike
13 front holding yoke
14 rear holding yoke
15 holding element
15a stopping recess
15b stopping bolt 16 sliding element
17 guiding projection
18 arresting lever
19 toothing
20 toothing rack
21 arresting element
22 hole
23 actuating lever
24 sliding profile
25 guiding protrusion
26 L-shaped projection
27 engagement groove
28 holding projection
29 slot nut
30 threaded pin
31 through-holes
32 clamping nut
33 rear wheel
34 wheel holder
35 wheel holder body
36 wheel receiving deepening
37 tensioning device
38 tensioning belt
L longitudinal direction
X first pivot axis
Y second pivot axis

The invention claimed is:

1. A bike carrier for attachment to a vehicle with a base body (4), which defines a longitudinal direction (L) and carries fixing means for fixing a first wheel of a bike (12), and a sliding profile (24), which is moveably held at the base body (4) such that it can be moved relative to the base body (4) in the longitudinal direction (L) and which carries fastening means for fixing the second wheel of a bike (12), wherein the fixing means comprise two holding yokes, which are held at the base body in order to surround the first wheel, wherein a front holding yoke can surround the first wheel from the front and rear holding yoke can surround the wheel from the rear so that the first wheel can be fixed to the base body in a form-fit manner, wherein the rear holding yoke is movably held at the base body so that the rear holding yoke can be moved against the first wheel, when the bike is pushed against a front holding yoke, and arresting means are provided in order to lock the rear holding yoke, when it is in contact with the first wheel, wherein the arresting means comprise a sliding element held slidingly at the base body in the longitudinal direction, wherein the sliding element is coupled with the rear holding yoke such that a translational movement of the sliding element relative to the base body is converted into a pivoting movement of the rear holding yoke relative to the base body;

wherein the base body (4) comprises a base profile (6), which is in engagement with the sliding profile (24) such that the sliding profile (24) is fixed to the base profile (6) perpendicularly to the longitudinal direction (L), but can be moved relative to the base profile (6) in the longitudinal direction (L), wherein, the base profile (6) has a substantially rectangular cross-section, wherein the sliding profile (24) has a U-shaped cross section, which is open towards the bottom and encompasses the base profile (6) from the top; and wherein a locking mechanism is provided in order to lock the sliding profile (24) relative to the base profile (6), wherein the locking mechanism comprises a slot nut (29), which is arranged in an engagement groove (27) of the sliding profile (24), wherein the slot nut (29) is connected to a threaded pin (30) which extends through corresponding through-holes (31) formed in the base body (4) and extends towards the bottom so that the threaded pin (30) projects downwardly from the base profile (6) and a clamping nut (32) is provided which can be screwed on the threaded pin (30) so that the sliding profile (24) can be braced to the base profile (6) between the slot nut (29) and the clamping nut (32).

2. A bike carrier according to claim 1, characterized in that the base profile (6) has on its upper side a guiding deepening (7) extending in the longitudinal direction (L), wherein the guiding deepening (7) has oblique side walls (8a, 8b) such that the guiding deepening (7) broadens upwards, and in that the sliding profile (24) comprises a corresponding guiding protrusion (25) engaging into the guiding deepening (7) and having a shape complementary to the shape of the guiding deepening (7).

3. A bike carrier according to claim 2, characterized in that the base profile (6) comprises a guiding groove (9) having a rectangular shape, which is arranged centrally in the guiding deepening (7), and the sliding profile (24) has, in a central section of the protrusion (25), two L-shaped projections (26) extending downwards in facing towards each other so that they form a T-shaped engagement groove (27) in the sliding profile (24) open towards the bottom.

4. A bike carrier according to claim 1, characterized in that the base profile (6) has on both lateral sides a T-shaped holding groove (10) and the sliding profile (24) has lateral U-legs and corresponding elongated holding projections (28) on each lateral U-leg, each elongated holding projection having a cross section in the shape of a L engaging behind the holding groove (10).

5. A bike carrier according to claim 1, characterized in that the fastening means comprise a wheel holder, which is held on the sliding profile (24) such that it can be moved relative to the sliding profile (24) in the longitudinal direction (L).

6. A bike carrier according to claim 5, characterized in that the wheel holder (34) comprises a wheel holder body (35), which is in a form-fit engagement with the sliding profile (24) such that the wheel holder body (35) can be moved relative to the sliding profile (24) in the longitudinal direction (L) but is fixed to the sliding profile (24) perpendicularly to the longitudinal direction (L), and/or in that a tensioning device (37) is provided, by means of which the first wheel of a bike (12) can be fixed to the wheel holder, wherein the tensioning device (37) comprises a tensioning belt (38), which is, at one end, fixed to the wheel holder body (35) and can be laid around the wheel of a bike (12) and, at its other end, can be releasably attached to the wheel holder body (35), so that the first a wheel of a bike (12) can be fixed to the wheel holder.

7. A bike carrier according to claim 1, characterized in that the front holding yoke (13) is held pivotably, at the base body (4) between a use position, in which the bike (12) to be fixed can be pushed with its front wheel (11) against the front holding yoke (13), and a transport position, in which the front holding yoke (13) extends substantially in the longitudinal direction (L).

8. A bike carrier according to claim 1, characterized in that the arresting means comprise two arresting levers (18), which are arranged on opposite lateral sides of the base body (4), wherein each arresting lever (18) is held pivotably at the sliding element (16) and at the rear holding yoke (14), wherein the pivot axis of the arresting lever (18) relative to the rear holding yoke (14) is spaced apart from the pivot axis of the rear holding yoke (14) relative to the base body (4).

9. A bike carrier according to claim 1, characterized in that the arresting means comprise an arresting mechanism, by means of which the sliding element (16) can be locked relative to the base body (4).

10. A bike carrier according to claim 1, characterized in that the arresting mechanism comprises at least two toothings (19) arranged on opposite lateral sides of the base profile (6) and corresponding arresting elements (21), which are pivotably held at the sliding element (16) between an arresting position, in which they are in engagement with the toothing (19) of the base profile (6) so that the sliding element (16) is locked relative to the base profile (6), and a release position, in which they are out of engagement from the toothing (19) so that the sliding element (16) can be moved relative to the base body (4).

11. A bike carrier for attachment to a vehicle with a base body (4), which defines a longitudinal direction (L) and carries fixing means for fixing a first wheel of a bike (12), and a sliding profile (24), which is moveably held at the base body (4) such that it can be moved relative to the base body (4) in the longitudinal direction (L) and which carries fastening means for fixing the second wheel of a bike (12), wherein the fixing means comprise two holding yokes, which are held at the base body in order to surround the first wheel, wherein a front holding yoke can surround the first wheel from the front and rear holding yoke can surround the wheel from the rear so that the first wheel can be fixed to the base body in a form-fit manner, wherein the rear holding yoke is movably held at the base body so that the rear holding yoke can be moved against the first wheel, when the bike is pushed against a front holding yoke, and arresting means are provided in order to lock the rear holding yoke, when it is in contact with the first wheel, wherein the arresting means comprise a sliding element held slidingly at the base body in the longitudinal direction, wherein the sliding element is coupled with the rear holding yoke such that a translational movement of the sliding element relative to the base body is converted into a pivoting movement of the rear holding yoke relative to the base body;

wherein the arresting means comprise two arresting levers (18), which are arranged on opposite lateral sides of the base body (4), wherein each arresting lever (18) is held pivotably at the sliding element (16) and at the rear holding yoke (14), wherein the pivot axis of the arresting lever (18) relative to the rear holding yoke (14) is spaced apart from the pivot axis of the rear holding yoke (14) relative to the base body (4).

12. A bike carrier for attachment to a vehicle with a base body (4), which defines a longitudinal direction (L) and carries fixing means for fixing a first wheel of a bike (12), and a sliding profile (24), which is moveably held at the base body (4) such that it can be moved relative to the base body (4) in the longitudinal direction (L) and which carries fastening means for fixing the second wheel of a bike (12), wherein the fixing means comprise two holding yokes, which are held at the base body in order to surround the first wheel, wherein a front holding yoke can surround the first wheel from the front and rear holding yoke can surround the wheel from the rear so that the first wheel can be fixed to the base body in a form-fit manner, wherein the rear holding yoke is movably held at the base body so that the rear holding yoke can be moved against the first wheel, when the bike is pushed against a front holding yoke, and arresting means are provided in order to lock the rear holding yoke, when it is in contact with the first wheel, wherein the arresting means comprise a sliding element held slidingly at the base body in the longitudinal direction, wherein the sliding element is coupled with the rear holding yoke such that a translational movement of the sliding element relative to the base body is converted into a pivoting movement of the rear holding yoke relative to the base body;

wherein the arresting mechanism comprises at least two toothings (19) arranged on opposite lateral sides of the base profile (6) and corresponding arresting elements (21), which are pivotably held at the sliding element (16) between an arresting position, in which they are in engagement with the toothing (19) of the base profile (6) so that the sliding element (16) is locked relative to the base profile (6), and a release position, in which they are out of engagement from the toothing (19) so that the sliding element (16) can be moved relative to the base body (4).

\* \* \* \* \*